(12) United States Patent  (10) Patent No.: US 7,857,888 B2
Niisawa et al.  (45) Date of Patent: Dec. 28, 2010

(54) METHOD FOR SEPARATION AND RECOVERY OF NOBLE METALS

(75) Inventors: Kazuhiro Niisawa, 3-8, Oi 2-chome, Shinagawa-ku, Tokyo (JP) 1400014; Kazuo Shimizu, Tsukuda (JP); Tadashi Nozaki, Isehara (JP)

(73) Assignees: Asaka Riken Co., Ltd., Fukushima (JP); Kazuhiro Niisawa, Tokyo (JP)

( * ) Notice: Subject to any disclaimer, the term of this patent is extended or adjusted under 35 U.S.C. 154(b) by 344 days.

(21) Appl. No.: 12/160,852

(22) PCT Filed: Jan. 12, 2007

(86) PCT No.: PCT/JP2007/050318

§ 371 (c)(1),
(2), (4) Date: Jul. 14, 2008

(87) PCT Pub. No.: WO2007/080963

PCT Pub. Date: Jul. 19, 2007

(65) Prior Publication Data

US 2010/0224029 A1  Sep. 9, 2010

(30) Foreign Application Priority Data

Jan. 13, 2006 (WO) .................. PCT/JP2006/300356

(51) Int. Cl.
*C22B 3/24* (2006.01)
(52) U.S. Cl. .............................. 75/721; 75/722; 75/723
(58) Field of Classification Search ............ 75/721–723
See application file for complete search history.

(56) References Cited

U.S. PATENT DOCUMENTS 4,229,270 A  10/1980  Subramanian et al.

(Continued)

FOREIGN PATENT DOCUMENTS

JP  46-7453 A  12/1971

(Continued)

OTHER PUBLICATIONS

Machine translation of JP 200193763 published Jul. 27, 2006.*

(Continued)

*Primary Examiner*—George Wyszomierski
*Assistant Examiner*—Tima M McGuthry-Banks
(74) *Attorney, Agent, or Firm*—Sughrue Mion, PLLC

(57) ABSTRACT

A method for separation and recovery of noble metals which makes it possible to isolate noble metal components efficiently by easy operation, that is, a method which comprises passing a solution of metals in hydrochloric acid prepared by treating a metal material with hydrochloric acid through the first cellulose column, eluting through development the noble metal component adsorbed on the cellulose with a hydrochloric acid/2-propanone mixture to obtain a fraction containing light platinum-group metals and a fraction containing heavy platinum-group metals and gold, separating the former fraction with the above mixture into fractions containing palladium, ruthenium and rhodium respectively, passing the fraction containing heavy platinum-group metals and gold through the second cellulose column to made them adsorbed on the cellulose, eluting them from the cellulose with a hydrochloric acid/1-butanol mixture to obtain fractions containing gold, osmium, iridium and platinum respectively, and recovering the noble metals from the fractions containing them respectively as simple substances.

7 Claims, 1 Drawing Sheet

U.S. PATENT DOCUMENTS

| | | | |
|---|---|---|---|
| 4,390,366 A | 6/1983 | Lea et al. | |
| 4,543,169 A | 9/1985 | D'Agostino et al. | |
| 4,762,556 A | 8/1988 | Hodgkin et al. | |
| 4,885,143 A | 12/1989 | Schmuckler | |
| 4,936,910 A | 6/1990 | Dadgar et al. | |
| 5,879,644 A | 3/1999 | Grant et al. | |
| 6,364,931 B1 | 4/2002 | Robinson et al. | |
| 6,365,049 B1 | 4/2002 | Smith | |

FOREIGN PATENT DOCUMENTS

| | | | |
|---|---|---|---|
| JP | 48-13219 A | | 2/1973 |
| JP | 54-004816 A | | 1/1979 |
| JP | 55-050439 A | | 4/1980 |
| JP | 62-238337 A | | 10/1987 |
| JP | 09-133670 | | 5/1997 |
| JP | 2001-098335 A | | 4/2001 |
| JP | 2001-516808 A | | 10/2001 |
| JP | 2002-303614 A | | 10/2002 |
| JP | 2006-193763 A | | 7/2006 |
| JP | 2006193763 A | * | 7/2006 |
| JP | 2006-348359 A | | 12/2006 |
| RU | 2175679 C2 | | 11/2001 |
| WO | 0233135 A1 | | 4/2002 |

OTHER PUBLICATIONS

Majumbar et al., "Paper Chromatography in the Separation of Ions II. Separation of Precious Metals," Analytica Chimica Acta, vol. 19, 1958, pp. 129-131.

Ginzburg et al., Analytical Chemistry of Platinum Metals, Wiley & Sons, 1975, pp. 466-479.

Extended European Search Report corresponding to European Patent Application No. 07706660 dated Feb. 23, 2010.

* cited by examiner

US 7,857,888 B2

METHOD FOR SEPARATION AND RECOVERY OF NOBLE METALS

CROSS REFERENCE TO RELATED APPLICATION

This application is a National Stage of International Application No. PCT/JP2007/050318 filed on Jan. 12, 2007, claiming priority based on International Application No. PCT/JP2006/300356, filed Jan. 13, 2006, the contents of all of which are incorporated herein by reference in their entirety.

TECHNICAL FIELD

The present invention relates to a method for separation and recovery of noble metals, and more particularly, to an improved method which make it possible to isolate and recover noble metal components in pure state, from materials containing a plurality of metals such as raw ore of noble metals or waste materials including catalysts for purifying automobile exhaust gas, electronic component and artificial tooth materials, using a cellulose column, and further, to reuse the spent cellulose column as many times as possible.

BACKGROUND ART

Gold and platinum are used as ornamental materials, raw materials of electrodes, catalysts or the like, palladium is used as catalysts, raw materials of hydrogen storing alloy or the like, iridium is used as raw materials of electrodes for electrolysis, spark plugs, semiconductor electrodes (flash memory, etc.) and melting pots or the like, and ruthenium and rhodium are used as raw materials of electrode, various kinds of ceramics and catalysts for purifying automobile exhaust gas, or the like which are industrially widely used.

To separates and recover these noble metals from raw materials containing the noble metals, there have been proposed various methods such as an electrolysis method, a chemical conversion method, an ion exchange method, a solvent extraction method, an adsorption method, and a combination method of them.

For example, in separating and recovering gold from raw ore, there have been known a method of solving raw ore to separate gold-containing fractions, treating them into gold-salt-containing aqueous solution by hydrochloric acid and chlorine or aqua regia, and electrolyzing the gold-salt-containing solution, thereby separating and recovering gold (see Patent Document 1 as mentioned below), a method of treating gold-salt-containing solution by ion exchange resin (see Patent Document 2), a method of solvent extraction with dibutyl carbitol (see Patent Document 3), a method for recovery by solvent extraction using 4-methyl-2-pentanon and adsorption to chelate resin (see Patent Document 4), and a method for recovery by adsorption on peat (Patent Document 5).

In these methods, since gold is recovered as gold salt, finally, it is necessary to convert gold salt into gold by reduction treatment.

As a method for separating and recovering each noble metal from raw materials containing a plural kinds of noble metals, there have been known method as follows: a method of passing a chloride solution containing at least two noble metals through at least one chromatographic column containing a solid adsorbent having a Kd above 1, which adsorbs the noble metals on the adsorbent, and subsequently eluting the noble metals by a halide salt solution, to obtain thereby separate fractions, each fraction containing only one single noble metal and coming out in the order: Ru, Rh, Pd, Pt, Ir and Cs (see Patent Document 6); an interseparation method of noble metals comprising: passing a noble-metal-containing halide feed solution through a chromatograph medium and adsorbing noble metals on the medium; and eluting the noble metals using an eluent to obtain separate fractions, each fraction containing at least one noble metal so that Ir and Ru ions are separated in an trivalent oxidation state (see Patent Document 7); a method for the interseparation of iridium from an admixture of noble metals containing iridium and other noble metals, comprising: passing an acidic solution containing chlorocomplexes of iridium and other noble metals through at least one chromatography column containing a solid absorbent; eluting one or more fractions containing one or more noble metals; ensuring the iridium is present on the column in a tetravalent oxidation state; and reducing the iridium on the column from a tetravalent oxidation state to a trivalent oxidation state and separating an iridium (III) chlorocomplex from chlorocomplexes of other noble metals; (see Patent Document 8); a method of inter-separating platinum-group metals comprising; (a) adjusting the acidity of the feedstock solution to be in the range of 5.5 to 6.5 M HCl, (b) adjusting the redox potential of the feedstock solution to at least approximately 500 mV, (c) passing the acidity- and redox-adjusted solution through a chromatographic medium causing the base metals, other impurity elements and platinum-group metals to interact with the chromatographic medium, and (d) eluting at least platinum and palladium in separate fractions from the medium using an eluent (see Patent Document 9); and a method of interseparating noble metals from a halide solution thereof, the method comprising: passing the solution through a glycol metacrylate chromatographic medium, adsorbing the noble metals onto the medium, and eluting each adsorbed noble metal with an acidic solution to obtain separate fractions (see Patent Document 10).

However, in all of these methods, it is necessary to use special adsorbents and eluents, thereby raising costs. In addition, the separation operation is complicated and separation efficiency is low. Therefore, these methods are not satisfactory as the industrial method for separation of noble metals.

Accordingly, in this field, a method for separation and recovery of noble metals has been demanded, which uses easily available adsorbents and eluents and makes it possible to isolate noble metals by easy operation, and is thereby industrially satisfactorily usable.

Cellulose is an easily available and low cost adsorbent, and there were reported several examples of separating noble metals using cellulose. For example, as a method of separating platinum using a cellulose column, there was reported a method of obtaining noble metal chlorides, the method comprising: passing an admixture of conc. hydrochloric solution of platinum, palladium, rhodium and iridium through the cellulose column, developing 4-methyl-2-pentanon as a mobile phase, firstly eluting platinum and iridium, subsequently eluting palladium, consequently eluting rhodium, and eliminating 4-methyl-2-pentanon from these eluates to obtain separate noble metal chlorides (Non-Patent Documents 1 and 2).

However, also in this case, it is necessary to use a special eluent, the operation is complicated, and the separation efficiency is low. Therefore, the method is thoroughly inappropriate to industrial application.

Thus, the present inventors had been carried out various researches on a method for individually separating and recovering noble metals from raw materials containing a plurality of noble metals and base metals by easy operation, using a cellulose column and using an easily available solvent as an eluent. As a result, the present inventors proposed a method for separating and recovering noble metals, the method comprising: dissolving raw materials with a hydrochloric acid to extract a plurality of noble metals and base metals as chloride solutions, passing the hydrochloric acid solution containing these metals through a cellulose column to adsorb noble metals thereon, subsequently eluting rhodium, palladium and the like from the column by using a mixed solution of hydrochloric acid and 2-propanone as a first eluent, and then eluting the other noble metals such as gold, platinum, iridium and ruthenium by using a mixed solution of hydrochloric acid and 1-butanol as a second eluent (Patent Document 11).

However, in this method, since the noble metals adsorbed on the single cellulose column are eluted by two kinds of eluents with the lapse of time, a long time is necessary from the time when the first group noble metals are completely eluted by the first eluent to the time when the elution is carried out by the second eluent. Accordingly, it is difficult to avoid that the whole operation time becomes long. In addition, in the case of reusing the cellulose column after all noble metals are eluted, the cellulose is alternately exposed to two different kinds of eluents, thereby significantly decreasing mechanical strength thereof. Moreover, adsorption capability of cellulose with respect to noble metals deteriorates, and thus the number of times of repeated uses decreases.

Patent Document 1: U.S. Pat. No. 4,229,270B
Patent Document 2: U.S. Pat. No. 4,543,169B
Patent Document 3: U.S. Pat. No. 4,390,366B
Patent Document 4: U.S. Pat. No. 4,762,556B
Patent Document 5: U.S. Pat. No. 4,936,910B
Patent Document 6: U.S. Pat. No. 4,885,143B
Patent Document 7: JP 9-133670A
Patent Document 8: JP 2001-98335A
Patent Document 9: JP 2001-516808A
Patent Document 10: JP 2002-303614A
Patent Document 11: JP 2006-193763A
Non-Patent Document 1: "Anal. Chim. Acta", 1958, pp. 129-131
Non-Patent Document 2: S. I. Ginzburg et al., "Analytical Chemistry of Platinum Metals", N.Y. Wiley & Sons, 1975, pp. 466-479.

DISCLOSURE OF THE INVENTION

The invention has been made to provide a method for separation and recovery of noble new noble metals, which is capable of efficiently separating noble metals in a pure state by easy operation from raw materials containing a plurality of metals by using adsorbents and a development eluent that is available with a large quantity and at a low price and are easily restorable after use, and which is suitable for application in an industrial scale in which adsorbents are repeatedly usable without decrease in adsorption capability for a long time.

Generally, metals included in platinum-group metals are similar with each other in behavior with respect to adsorption materials or solubility with respect to various kinds of solvents, and thus it is difficult to separate them from each other using adsorption and elution.

The present inventors had been carried out various researches. As a result, from that a group having a relatively large specific gravity among platinum-group metals, that is, heavy platinum-group metals, and a group having a relatively small specific gravity, that is, light platinum-group metals represent different behaviors with respect to a certain kind of solvent for elution and development after adsorption on a cellulose column and that gold which is one of noble metals represents a similar behavior with those of the heavy platinum-group metals with respect to the adsorption and development/elution, the inventors found out that it is possible to easily interseparate individual metal components from the materials containing the platinum-group metals and gold using the difference in their behavior, the operation time is shortened by separating the heavy platinum-group metals using another cellulose column, and the adsorption capability thereof can kept although a column filling agent is repeatedly used, thereby making the invention on the basis of these findings.

That is, the present invention is to provide a method for separation and recovery of noble metals as a method for separating and recovering individual noble metal components from metal materials containing noble metals, the method comprising:

(1) preparing a metal hydrochloric acid solution by treating the metals materials with hydrochloric acid;

(2) passing the metal hydrochloric acid solution obtained in the step (1) through a first cellulose column to adsorb all the noble metal components onto cellulose;

(3) flowing a mixed solution of hydrochloric acid and 2-propanone to the first cellulose column which has adsorbed the noble metal components in the step (2) to develop and sequentially elute the noble metal components, thereby separating the noble metal components into a fraction containing light platinum-group metals and a fraction containing heavy platinum-group metals and gold, and separating and recovering the fraction including heavy platinum-group metals and gold;

(4) further developing and eluting with the mixed solution of hydrochloric acid and 2-propanone to sequentially separate and collect a palladium containing fraction, a ruthenium containing fraction and rhodium containing fraction from the fraction containing light platinum-group metals;

(5) passing the fraction containing heavy platinum-group metals and gold obtained in the step (3) through a second cellulose column to adsorb noble metal components contained therein onto the second cellulose column;

(6) flowing a mixed solution of hydrochloric acid and 1-butanol to the second cellulose column which has adsorbed the noble metal components obtained in the step (5) to develop and sequentially elute the noble metal components, thereby separating and collecting a gold containing fraction, an osmium containing fraction, an iridium containing fraction and a platinum containing fraction; and (7) recovering the noble metals as isolated metals from the respective fractions collected in the steps (4) and (6).

Herein, the heavy platinum-group metals denote platinum-group metals having a specific gravity of approximately 22, that is, osmium (specific gravity 22.5), iridium (specific gravity 22.4) and platinum (specific gravity 21.5), and the light platinum-group metals denote platinum-group metals having a specific gravity of approximately 12, that is, ruthenium (specific gravity 12.2), rhodium (specific gravity 12.5) and palladium (specific gravity 12.0).

BEST MODE FOR CARRYING OUT THE INVENTION

Figure 1:
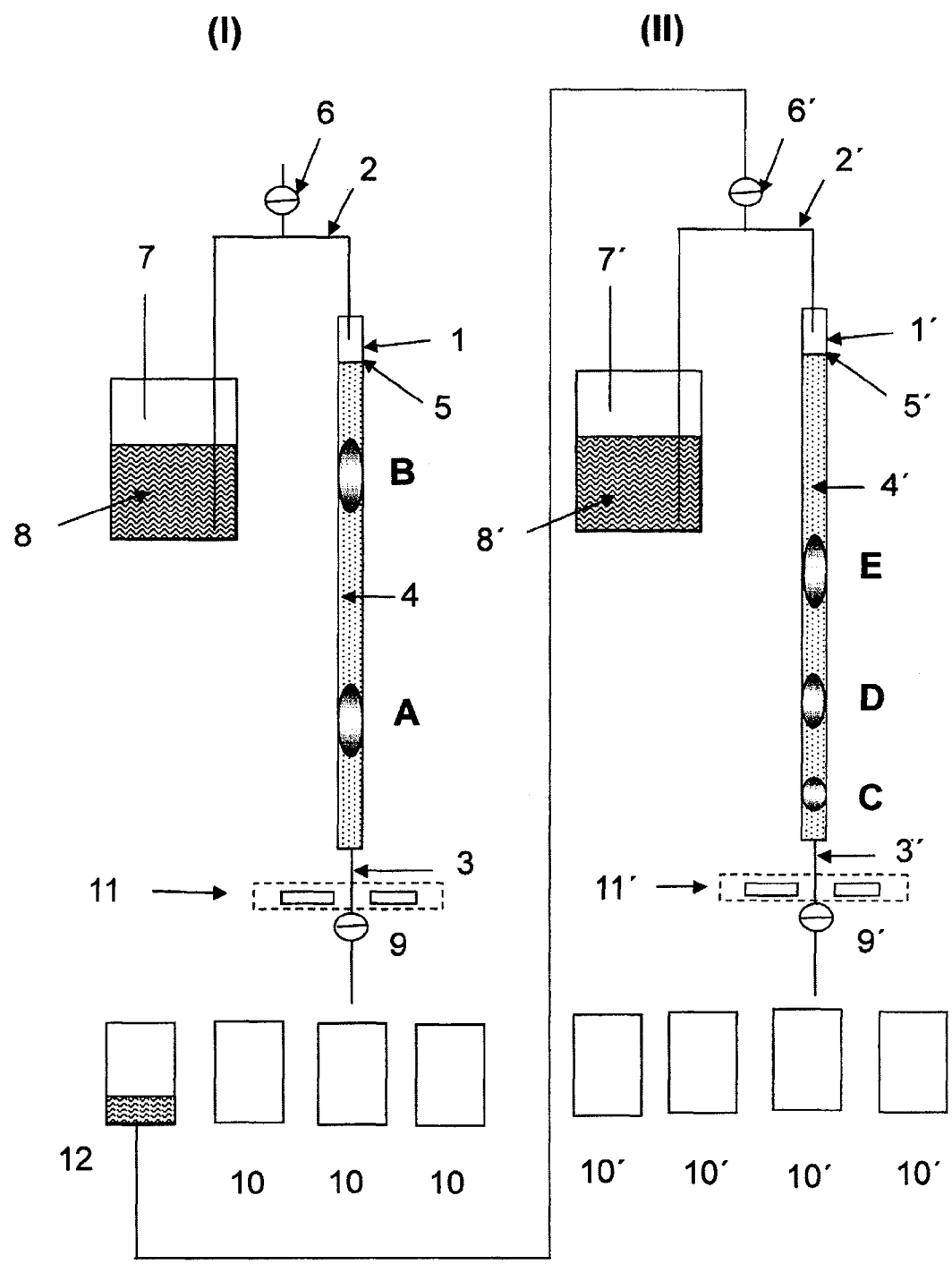
FIG. 1 is a diagram illustrating an example of an apparatus suitable for embodying the method according to the present invention.

Hereinafter, the invention will be described in detail. In the method according to the present invention, as metal materials containing noble metals used as raw materials, for example, there are raw ore of noble metals and wasted material to be ordinarily disposed such as wasted catalysts for purifying automobile exhaust gas, catalysts for synthetic reaction, electrolysis electrodes, electronic components, and artificial tooth materials. Examples of the raw ore include gold ore, platinum ore, nickel ore remnants and the like, which generally contain plural kinds of unnamed and not-specified noble metals and base metals. Accordingly, it is generally necessary to pass through all the above-described steps (1) to (6) using two cellulose column and two kinds of eluents. Thus, it is possible to know the kind of individual noble metals contained in the processed raw materials.

However, in the case that the kinds of noble metals contained in electrode materials, catalysts, artificial tooth materials have been known to some extent, it is possible to omit any one of steps that are not necessary for recovery of the noble metals, for example, any one of the adsorbing process such as the steps (2) or (5) and the developing and eluting steps (3) and (4) or the step (6) can be omitted.

In the step (1) according to the present invention, materials containing noble metals are treated with hydrochloric acid to prepare hydrochloric acid solution. Noble metals are stable against acid and are not dissolved by hydrochloric acid. However, when an oxidizer coexists, the noble metals are dissolved to form hydrochloric acid solution of chloride. As the oxidizer in this case, chlorides, chloride generating compounds, for example, perchloric acid, salt thereof, concentrated nitric acid and the like may be used. A mixed solution of 3-volume of concentrated nitric acid and 1-volume of concentrated nitric acid is so-called aqua regia, which easily dissolves gold, platinum and most of noble metals. Silver reacts with hydrochloric acid to be silver chloride, most of which is precipitated, and thus silver is removed by solid-liquid separating means such as filtration and centrifuge.

When materials containing noble metals are dissolved using concentrated nitric acid or aqua regia, it is preferable that the obtained solution is heated to about 100° C., air or inert gas are bubbled to remove nitric acid, and then the step (2) and the following processes are performed.

In the step (2), the hydrochloric acid solution containing noble metals obtained in the step (1) is allowed to pass through a column filled with cellulose as an adsorbent, that is, the first cellulose column. In this case, a flow rate is preferably 15 to 40 ml/hr per unit area.

The cellulose used in this process may be made of any one of natural cellulose, regenerated cellulose, mercerized cellulose and the like, which may be selected from cellulose having high α-cellulose content and used as a filler of general chromatography. Particularly, granular cellulose suitable as a column filler is preferable. It is preferable to use this cellulose as powder having a diameter that can be embodied in an industrial scale, that is, a volume weight of 0.15 to 0.40 g/ml, but fiber-type cellulose may be used as necessary. As the fiber-type cellulose, fibril cellulose is preferable.

In the step (2), metals including base metals contained in hydrochloric acid solution are adsorbed on cellulose.

In the step (3), while the adsorbed noble metals are developed by flowing a mixed solution of hydrochloric acid and 2-propanone to the first cellulose column which has adsorbed the noble metals as described above, the noble metals are eluted, the noble metals are separated into a fraction containing light platinum-group metals and a fraction containing heavy platinum-group metals and gold, and the fraction including heavy platinum-group metals and gold is collected and recovered. In this case, as the development eluent, a mixed solution of hydrochloric acid having concentration of 2 to 12M preferably, 2 to 10M and 2-propanone at a volume ratio of 1 to 5; to 1 to 10 is used.

This separation is performed by detecting the fractions using a sensor having factors such as absorbance of ultraviolet rays or visible rays, refractive index, conductivity and X-ray, and by dividing fractions into different containers using a switching valve or the like.

In the step (4), when the development and separation using the mixed solution of hydrochloric acid and 2-propanone are further continued, a palladium containing fraction, a ruthenium containing fraction and rhodium containing fraction is sequentially eluted. Then, these fractions are separated and collected.

In the step (5), the fraction containing heavy platinum-group metals and gold obtained in the step (3) is allowed to pass through a second cellulose column to adsorb noble metals onto cellulose. In the step (6), a mixed solution of hydrochloric acid and 1-butanol is allowed to flow to the second cellulose column to develop and elute the adsorbed noble metal components. A gold containing fraction, an osmium containing fraction, an iridium containing fraction, and a platinum containing fraction are sequentially eluted by the development and elution process. These fractions are separated and collected in the same manner as the step (4). As the cellulose filling the second cellulose column used in the step (5), the same cellulose as the cellulose used for the first cellulose column may be used. As the development eluent used in the step (6), a mixed solution of hydrochloric acid having concentration of 1 to 12M, preferably, 2 to 10M and 1-butanol at a volume ratio of 1 to 5; to 1 to 10 is used.

Among metals except noble metals included in raw materials, that is, base metals, metals having low affinity to cellulose, for example, zinc, iron and the like are flowed out without adsorbing them on the first cellulose column. Accordingly, these base metals are separated and removed in the step (2).

Metals having high affinity to cellulose, for example, copper, chrome, nickel, manganese, lead and the like are adsorbed together with noble metals on the first cellulose column and possibly the second cellulose column. However, in the steps (3) and (6), these base metals represent very different behavior from noble metals with respect to the development eluent. Therefore, in these processes, it is possible to easily separate such base metals.

The palladium containing fraction, the ruthenium containing fraction and rhodium containing fraction, which can be obtained in the step (4), or the gold containing fraction, the osmium containing fraction, the iridium containing fraction and the platinum containing fraction, which can be obtained in the step (6), include noble metals as hydrochlorides. Accordingly, in the step (7), hydrochloric acid, 2-propanone or 1-butanol are removed by distillation operation such as distillation under reduced pressure, and then solid residues are roasted or reduced, thereby isolating and recovering the desired noble metals as a metal group.

Next, an embodiment for continuously carrying out the present invention will be described with reference to the drawing.

FIG. 1 is a diagram illustrating an example of an apparatus for embodying the method according to the present invention, which includes a first cellulose column unit (I) comprising a standing column 1, a liquid feed pipe 2 connected to the top of the column 1, and a liquid drain pipe 3 connected to the bottom of the column 1; and similarly, a second cellulose column unit (II) comprising a column 1', a liquid feed pipe 2', and a liquid drain pipe 3'.

In the columns 1 and 1', cellulose powder filling layers 4 and 4', and filters 5 and 5' for fixing them are housed, respectively. The liquid feed pipe 2 of the first cellulose column unit (I) communicates with a metal-containing hydrochloric acid solution container (not shown) and a development eluent container 8 through a switching valve 6. The liquid drain pipe 3 communicates with a plurality of division receptacles 10 through an electronic switching valve 9. A detector 11 is disposed to the liquid drain pipe 3 between the column bottom and the electronic switching valve 9, and the switching valve 9 is operated according to the detection result. The switching valve 6 also serves as a connection pipe for a compressor and a pressure control port, which applies pressure to the column to control a flow rate of a developing solution. The first cellulose column unit (I) is used to isolate and recover light noble metals after flowing out gold and heavy noble metals, and the second cellulose column unit (II) is used to isolate and recover noble metals of gold and heavy noble metals. The liquid feed pipe 2' of the second cellulose column unit (II) is connected to a receptacle 12 for a first fraction A of the division receptacles 10 of the first cellulose column unit (I) through a switching valve 6'.

To carry out the present method, first, a metal-containing hydrochloric acid solution is supplied from the metal-containing hydrochloric acid solution container (not shown) to the top of the column 1 by operating the switching valve 6, and then the hydrochloric acid solution is allowed to pass through the cellulose filling layer 4. During the hydrochloric acid solution passes through the column, metal chlorides in the hydrochloric acid solution are adsorbed onto the cellulose.

Then, a development eluent, that is, an admixture of hydrochloric acid solution and 2-propanone is introduced by switching the switching valve 6, so that the noble metals are separated into a fraction A containing heavy platinum-group metals and gold and a fraction B containing light platinum-group metals. Then, when the development eluent is continuously supplied, first, the fraction A containing heavy platinum-group metals and gold is flow out from the bottom of the column. At this time, metal components in the liquid drain pipe 3 are detected by the detector 11, and the solution is collected in the receptacle 12 for a fraction A until the metal components in the flowing-out solution are changed. When the change of the metal components is detected, information about that is transmitted to a switching mechanism (not shown) of the electronic switching valve 9, and the switching valve 9 automatically switched from the flow path for the receptacle 12 to the other flow path for the other division receptacle 10.

After all the heavy platinum-group metals and gold are separated and recovered as described above, the same development eluent, i.e., the mixed solution of hydrochloric acid and 2-propanone is supplied from a development eluent supply pipe 7 to the development eluent container 8 to continue the development again. In this case, noble metals included in a light platinum group are individually separated and eluted, which are collected in the receptacles 10 by operating the switching valve 9, respectively. Accordingly, it is possible to obtain a rhodium containing fraction, a ruthenium containing fraction, and a palladium containing fraction.

Meanwhile, the above-described fraction A containing the heavy platinum-group metals and gold collected in the receptacle 12 is allowed to pass through the other column 1' having the same structure as that shown in FIG. 1 so that noble metal components are adsorbed onto cellulose. Subsequently, a mixed solution of hydrochloric acid and 1-butanol is used as a development eluent, heavy platinum-group metals and gold are separated and collected by the same operation described above. Thus, a gold containing fraction, an osmium containing fraction, an iridium containing fraction and a platinum containing fraction are subsequently obtained. Development and elution of the fraction containing heavy platinum-group metals and gold are performed using a different column from the column used in the development and separation of the light platinum-group metals. Both of two column operations can be performed at once together with them. Accordingly, it is possible to remarkably shorten the recovery time of the metals.

An elution rate of the development and elution is set as a rate sufficient to completely separate the noble metal containing fractions, thereby increasing purity of each noble metal contained in each fraction. As a result, it is possible to obtain high-purity noble metals.

2-propanone and 1-butanol in the used development eluents, i.e., the mixed solution of hydrochloric acid and 2-propanone used for the first cellulose column and the mixed solution of hydrochloric acid and 1-butanol used for the second cellulose column are distilled and refined after the recovery, which can be reused. Although a part of cellulose recovered from the first and second cellulose columns is converted to glucose by the reaction with hydrochloric acid, the cellulose can be reused by washing it to remove glucose. Since the cellulose recovered from the respective columns is treated only with the respective development eluents, there is a little decrease in mechanical strength or adsorption capability as compared with the case of treatment of the conventional single column using two kinds of development eluents. Accordingly, the number of times of regeneration repetition use increases.

In the method according to the present invention, it is not necessary to carry out the processes under heating as the conventional method, and all the processes can be operated under room temperature.

Next, the best mode for carrying out the present invention will be described by examples, but the present invention is not limited to these examples at all.

Comparative Example 1

Mixture of rhodium, manganese, copper, iron, chrome, nickel and lead was dissolved by adding aqua regia thereto, and then nitric acid was removed by heating and concentrating. Rhodium chloride crystals were deposited by the concentration, and concentrated hydrochloric acid was added thereto, which was completely dissolved. A part of rhodium chloride was reduced by this treatment, and thus this was completely oxidized by passing through chlorine gas, thereby preparing, as a chloride, 10 ml of a hydrochloric acid solution containing rhodium 0.166 g, manganese 0.345 g, copper 1.685 g, iron 1.493 g, chrome 0.023 g, nickel 0.028 g and lead 0.026 g. Subsequently, 50 ml of 2-propanone and 10 g of cellulose powder (produced by Nippon Paper Chemicals Co., Ltd., products name "KC FLOCK") were added to the prepared hydrochloric acid solution, followed by stirring the mixture under room temperature in atmosphere of nitrogen for 4 hours. After all metal ions in the solution were adsorbed on cellulose powder, the mixture was filtrated. The filtration residues were washed by 20 ml of 2-propanone three times. Then, water was allowed to pass through the cellulose adsorbing the metal ions so that the metal ions were removed from the cellulose to the aqueous solution.

The resultant aqueous solution was quantitatively analyzed by an atom extinction analyzer to determine the concentration of the metal ions, and a recovery ratio thereof was acquired.

As a result, the recover ratio of rhodium was 89.0 mass %, manganese was 96.0 mass %, copper was 78.0 mass %, iron was 0.5 mass %, chrome was 83.0 mass %, nickel was 99.0 mass %, and lead was 99.0 mass %.

Rhodium was efficiently recovered as a rhodium chloride hydrate by this method. In this case, a considerable amount of iron was removed, but the other base metals remained together with rhodium.

To increase purity of rhodium, the rhodium chloride was isolated from the other noble metal chlorides or base metal chlorides by the process using the first column. Rhodium could be obtained as a single component, by adding magnesium powder while heating the hydrochloric acid solution.

Comparative Example 2

Previously, gold was dissolved by aqua regia. Rhodium powder was allowed to pass through hydrogen at about 200° C. so that no rhodium oxide remained, which was put into a 6 M hydrochloric acid solution, and then was heated to 80° C. while passing through chlorine gas, metal rhodium was made into a chloride. The chlorauric acid and rhodium chloride solutions obtained in such a manner were under reduced pressure. The chlorauric acid solution was concentrated until removing nitrogen. The deposited rhodium chloride crystal was dissolved by concentrated hydrochloric acid, thereby preparing 10 ml of a hydrochloric acid solution including gold 1.465 g and rhodium 0.2333 g, which was used as a standard reagent.

The standard reagent was divided into five equal parts, which were put into five beakers having a volume of 50 ml, respectively. 10 g of cellulose powder and 2-propanone, which were the same used in Comparative Example 1, were added to one of them, and they were stirred under room temperature in atmosphere of nitrogen for 4 hours, thereby adsorbing rhodium ions in the solution on cellulose.

Subsequently, the cellulose adsorbing the rhodium was washed three times by 20 ml of 2-propanone, the rhodium was separated from the cellulose by hydrochloric acid solution. Chlorauric acid was transferred into 2-propanone solution by this operation, subsequently, this solution was under reduced pressure, and then was dissolved in water, thereby obtaining an aqueous solution of chlorauric acid. The same operation was repeated four times, using the same cellulose.

Gold ion concentration and rhodium ion concentration of five sample solutions obtained in such a manner were determined by an atom extinction method, and a recover ratio thereof was obtained. The result is shown in Table 1.

TABLE 1

| Number of Repetition | | 0 | 1 | 2 | 3 | 4 |
|---|---|---|---|---|---|---|
| Recovery Ratio (%) | Au | 99.1 | 98.7 | 95.2 | 90.2 | 85.3 |
| | Rh | 97.3 | 95.5 | 93.6 | 87.5 | 82.1 |

On the other hand, for comparison, a standard reagent consisting of 10 ml of hydrochloric acid solution containing rhodium 0.2512 g was prepared, 10 g of cellulose powder and 50 ml of 2-propanone were added to 1 ml of the standard reagent, which were mixed with stirring under room temperature in atmosphere of nitrogen for 4 hours, and rhodium ions in the solution were adsorbed on cellulose. The process was repeated four times, using a new standard reagent for each time. As a result, the first recovery ratio was 98.2%, the last recovery ratio was 97.8%, and decrease in recovery ratio caused by the repeated use was hardly recognized.

Example 1

100 Gram of 6M hydrochloric acid solution containing Ru 6.3 g, Rh 1.6 g, Pd 7.4 g, Ir 2.5 g, Pt 3.0 g and Au 6.4 g by chloride conversion was prepared and used as a sample.

A glass tube having an inner diameter of 10 mm and a length of 500 mm was filled with 13 g of cellulose which is the same as that used in Comparative Example 1, thereby producing a column. 1 ml of the sample was allowed to pass through the column, and noble metals were adsorbed onto cellulose.

Subsequently, elution was performed under ordinary pressure at 25° C. at a development rate of 0.2 ml/minute, using 200 ml of a mixed solution of 4.5 M hydrochloric acid and 2-propanone (volume ratio of 2-propanone and hydrochloric acid being 2.73). Thereby, a fraction including iridium, platinum and gold was recovered, while ruthenium, rhodium and palladium were retained in the column. A development eluent included in the collected fraction was removed by vacuum concentration, and then concentrated hydrochloric acid was added.

Then, the same eluent was allowed to flow from top of the column, and thus a palladium containing fraction, a ruthenium containing fraction and a rhodium containing fraction were sequentially collected.

The fraction including iridium, platinum and gold was allowed to pass through the other cellulose column and was adsorbed thereon and the development and elution were performed using an admixture of 40 ml of 3 M hydrochloric acid solution and 210 ml of 1-butanol. Thus, a gold containing fraction, an iridium containing fraction and a platinum containing fraction were sequentially separated and collected. The solvent was removed from the thus obtained fractions, and the residues were reduced by heating in hydrogen stream, thereby recovering noble metals. Recovery ratios and purities of the recovered noble metals are shown in Table 2.

TABLE 2

| Noble Metals | Ru | Rh | Pd | Ir | Pt | Au |
|---|---|---|---|---|---|---|
| Recovery Ratio (%) | 87.3 | 94.7 | 98.9 | 98.6 | 97.8 | 98.5 |
| Purity (%) | >99 | >99 | >99 | >98 (+Pt) | >98 (+Au) | >98 (+Pt) |

The insides of parentheses in the purity column denote the contaminating noble metals.

As can be seen from the table, it is possible to separate and recover individual noble metals in high purity, from raw materials containing a plurality of noble metals.

Example 2

The same process as Example 1 was performed on the hydrochloric acid solution containing rhodium used in Comparative Example 1. The Separated and Recovered Rhodium was analyzed for the presence of possible contaminating base metals in the same manner as Example 1. However, no traces of base metal was detected.

In the development and elution process, retention volume ($R_f$) of base metal salts is different from $R_f$ of noble metal salts. From this point, according to the present invention, it is possible to remove coexisting base metal salts from noble metal chlorides.

Example 3

In the case of using one column and in the case of using two columns, the examination result about separation states of noble metals, time necessary for separation and recovery and the like is described.

Using sample and column prepared in the same manner as Example 1, 1 ml of the sample was adsorbed onto cellulose, 200 ml of a first developer (volume ratio of 2-propanone and hydrochloric acid being 2.73) was allowed to flow in the column, and then a fraction A which firstly flowed out was collected. Subsequently, the first developer was removed by concentration under reduced pressure, concentrated hydrochloric acid was added thereto, and the total quantity was adjusted to 1 ml. Palladium, ruthenium and rhodium were completely removed from the first column, and were collected in individual receptacles, respectively. Then, a second developer (a mixed solution of 40 ml of 3 M hydrochloric acid and 210 ml of 1-butanol) was allowed to flow in this column, which remained until the column was substituted by the second developer. The noble metals-containing fraction A, which had been subjected to the above-described concentrated hydrochloric acid treatment, was adsorbed on cellulose, the second developer was allowed to flow. Gold, platinum and iridium which subsequently flowed out were collected together with the second developer.

Meanwhile, even in the case that the separation was performed by the second column different from the first column, the same sample, column and developer as Example 1 were used. Before performing the separation using the first column, the second column was previously filled with the second developer. As described above, a fraction A flowing out from the first column was collected and concentrated under reduced pressure. Then concentrated hydrochloric acid was added thereto to obtain 1 ml of solution, which was put in the second column. Then, separation of metal components was performed by the second developer.

The results of separation using single column and dual columns are shown in Table 3.

TABLE 3

| Experiment | Time for Developer Substitution (hour) | Time for Separation of All Components (hour) | Separation Width in Columns of Components in Fraction A (cm) | | |
|---|---|---|---|---|---|
| | | | Au | Pt | Ir |
| Separation by two columns | 0 | 8 | 5.2 | 6.5 | 8.7 |
| Separation by one column | 2 | 10 | 6.8 | 8.5 | 11.5 |

As can seen from the result of Table 3, in the case of the process using the single column, the time necessary for developer substitution was 2 hours, the separation time was 10 hours. On the contrary, in the case of the process using the two columns, the total time is 8 hours, that is, it was possible to shorten the time by 4 hours. In the case of performing separation and refinement in an industrial scale, this causes decrease in cost. Table 3 also show that, in the case of the process using the single column, a distribution width of each component of the fraction A gets larger as compared with the case using the two columns. The reason may be that the substitution of the second developer was not completely performed because one column was used. Also from this point, the recovery and separation using two columns have an advantage in the case of industrial recovery and separation.

INDUSTRIAL APPLICABILITY

The method according to the present invention is useful as the industrial method of recovery of noble metals since the invention has the following advantages.

(1) The operation is simple.

(2) All the used adsorbent and development eluent are easily available and inexpensive.

(3) The used cellulose, 2-propanone and 1-butanol can be reused by refining them.

(4) Energy consumption is low.

(5) Mass processes are possible by automation.

(6) Dangerousness of firing in the recovery and separation process due to static electricity is low because 2-propanone is easily dissolved in water and hydrochloric acid solution is dissolved in 2-propanone. Although 1-butanol is hardly dissolved in water as compared with 2-propanene, a flashing point thereof is higher than that of 2-propanone. Accordingly, the recovery and separation can be performed with a hydrochloric acid solution and 1-butanol with low dangerousness of firing due to static electricity, similar to that using 2-propanone.

(7) There is no fear of dioxin generation because a burning process is not performed in recovery of noble metals.

(8) There is no decrease in recovery ratio of metals due to the repeated use of cellulose columns.

Accordingly, the method according to the present invention can be suitably used in the case of extracting noble metals from raw ore of noble metal or in the case of recovering noble metals from waste materials containing noble metals, for example, wasted catalysts, electronic components and artificial tooth materials.

The invention claimed is:

1. A method for separation and recovery of noble metals as a method for separating and recovering individual noble metal components from metal materials containing noble metals, the method comprising:

(1) preparing a metal hydrochloric acid solution by treating the metals materials with hydrochloric acid;

(2) passing the metal hydrochloric acid solution obtained in the step (1) through a first cellulose column to adsorb all the noble metal components onto cellulose;

(3) flowing a mixed solution of hydrochloric acid and 2-propanone to the first cellulose column which has adsorbed the noble metal components in the step (2) to develop and sequentially elute the noble metal components, thereby separating the noble metal components into a fraction containing light platinum-group metals and a fraction containing heavy platinum-group metals and gold, and separating and recovering the fraction including heavy platinum-group metals and gold;

(4) further developing and eluting with the mixed solution of hydrochloric acid and 2-propanone to sequentially separate and collect a palladium containing fraction, a ruthenium containing fraction and rhodium containing fraction from the fraction containing light platinum-group metals;

(5) passing the fraction containing heavy platinum-group metals and gold obtained in the step (3) through a second cellulose column to adsorb noble metal components contained therein onto the second cellulose column;

(6) flowing a mixed solution of hydrochloric acid and 1-butanol to the second cellulose column which has adsorbed the noble metal components obtained in the step (5) to develop and sequentially elute the noble metal components, thereby separating and collecting a gold containing fraction, an osmium containing fraction, an iridium containing fraction and a platinum containing fraction; and (7) recovering the noble metals as isolated metals from the respective fractions collected in the steps (4) and (6).

2. The method for separation and recovery of noble metals according to claim 1, wherein the noble metals are at least two kinds selected from platinum-group metals and gold.

3. The method for separation and recovery of noble metals according to claim 1, wherein the preparation of hydrochloric acid solution in the step (1) is performed by dissolving the metal materials in hydrochloric acid in the presence of an oxidizer.

4. The method for separation and recovery of noble metals according to claim 3, wherein the oxidizer is chlorine or a chlorine generating compound.

5. The method for separation and recovery of noble metals according to claim 3, wherein the oxidizer is nitric acid.

6. The method for separation and recovery of noble metals according to claim 1, wherein the used first and second cellulose columns are washed with water, and then are reused in the steps (2) or (5).

7. The method for separation and recovery of noble metals according to claim 1, wherein the 2-propanone or 1-butanol used for the separation and elution in the steps (3) or (6) is refined and distilled, and then is reused.

* * * * *